United States Patent
Sachter-Zeltzer et al.

(10) Patent No.: US 9,990,763 B2
(45) Date of Patent: Jun. 5, 2018

(54) COMPUTERIZED SYSTEMS AND METHODS FOR LAYERING CONTENT IN A USER INTERFACE

(71) Applicant: Google Inc., Mountain View, CA (US)

(72) Inventors: Ariel Sachter-Zeltzer, Sunnyvale, CA (US); Christian Robertson, Pleasanton, CA (US); Jon Wiley, Mountain View, CA (US); John Nicholas Jitkoff, Kingsville, TX (US); Zachary Gibson, San Francisco, CA (US); David Haw Yun Chiu, Piedmont, CA (US)

(73) Assignee: Google LLC, Mountain View, CA (US)

( * ) Notice: Subject to any disclaimer, the term of this patent is extended or adjusted under 35 U.S.C. 154(b) by 4 days.

(21) Appl. No.: 14/747,493

(22) Filed: Jun. 23, 2015

(65) Prior Publication Data
US 2015/0371436 A1    Dec. 24, 2015

Related U.S. Application Data

(60) Provisional application No. 62/016,630, filed on Jun. 24, 2014.

(51) Int. Cl.
*G06T 15/60* (2006.01)
*G06T 19/00* (2011.01)
*G06F 3/0488* (2013.01)
*G06F 3/0481* (2013.01)
(Continued)

(52) U.S. Cl.
CPC .............. *G06T 15/60* (2013.01); *G06F 3/017* (2013.01); *G06F 3/0481* (2013.01);
(Continued)

(58) Field of Classification Search
CPC ........... G06F 2203/04802; G06F 3/017; G06F 3/0481; G06F 3/04815; G06F 3/04842; G06F 3/0486; G06F 3/0488; G06T 15/60
See application file for complete search history.

(56) References Cited

U.S. PATENT DOCUMENTS

| | | | | |
|---|---|---|---|---|
| 6,184,865 B1 * | 2/2001 | Zimmerman | .......... | G05G 9/047 345/160 |
| 6,915,490 B1 * | 7/2005 | Ewing | .......... | G06F 3/0481 715/767 |

(Continued)

OTHER PUBLICATIONS

European Patent Office, Invitation to Pay Additional Fees and, Where Applicable, Protest Fee, for related PCT application No. PCT/US2015/037178, dated Sep. 4, 2015 (4 pages).

(Continued)

*Primary Examiner* — Sing-Wai Wu
(74) *Attorney, Agent, or Firm* — Dority & Manning, P.A.

(57) ABSTRACT

Computer-implemented systems and methods are provided for analyzing and determining properties of virtual environments rendered on a display. The disclosed embodiments include, for example, a method for rendering a virtual environment, the method comprising operations performed with one or more processors. The operations of the method may include generating a plurality of object layers, the object layers representing permissible height values. The method may also include populating the environment with a plurality of objects, wherein each object is associated with a height value corresponding to one of the object layers. The method may also include determining whether any two objects form an occluded pair. The method may also include calculating a cast shadow index for each occluded pair reflecting a magnitude of a height differential between occluding object and the occluded object. The method may also include rendering the virtual environment in accordance with the calculated cast shadow indices.

20 Claims, 11 Drawing Sheets

(51) Int. Cl.
    *G06F 3/0484* (2013.01)
    *G06F 3/01* (2006.01)
    *G06F 3/0486* (2013.01)

(52) U.S. Cl.
    CPC .......... *G06F 3/0486* (2013.01); *G06F 3/0488* (2013.01); *G06F 3/04815* (2013.01); *G06F 3/04842* (2013.01); *G06F 2203/04802* (2013.01)

(56) References Cited

U.S. PATENT DOCUMENTS

| | | | | |
|---|---|---|---|---|
| 8,213,680 | B2* | 7/2012 | Fitzgibbon | G06K 9/00335 348/169 |
| 8,947,452 | B1* | 2/2015 | Ballagh | G06F 3/0486 345/420 |
| 2005/0149879 | A1* | 7/2005 | Jobs | G06F 3/0481 715/796 |
| 2007/0115283 | A1* | 5/2007 | Foster | G06T 15/60 345/426 |
| 2012/0218395 | A1 | 8/2012 | Andersen et al. | |
| 2012/0304102 | A1* | 11/2012 | LeVee | G06F 9/4443 715/779 |

OTHER PUBLICATIONS

European Patent Office, Notification of Transmittal of the International Search Report and the Written Opinion of the International Searching Authority, for related PCT application No. PCT/US2015/037178, dated Nov. 12, 2015 (16 pages).

\* cited by examiner

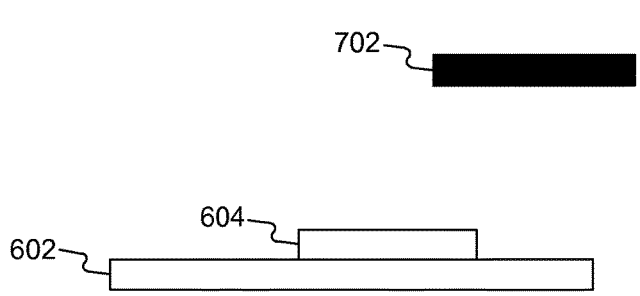
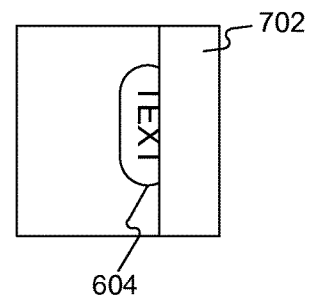
FIG. 7A  FIG. 7B
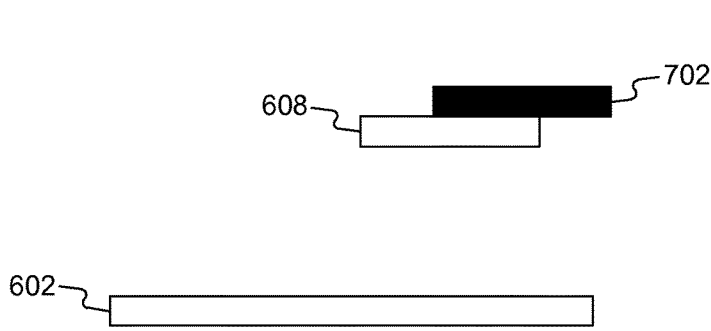
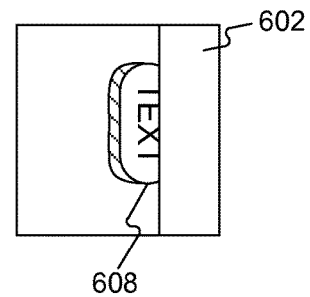
FIG. 7C  FIG. 7D

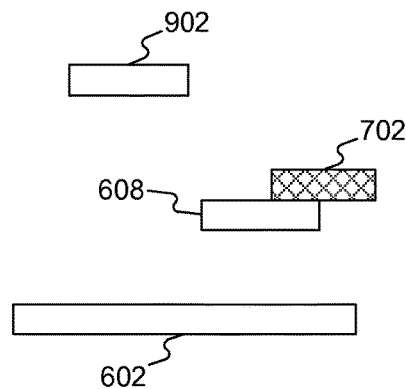
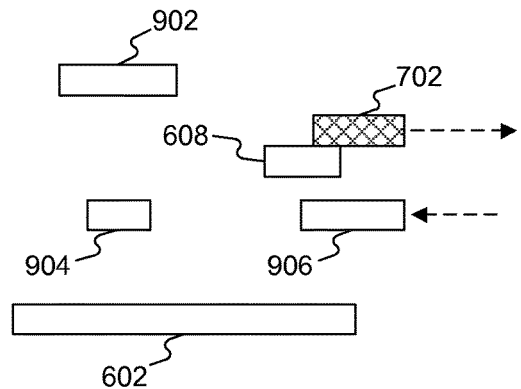
FIG. 9A                FIG. 9B
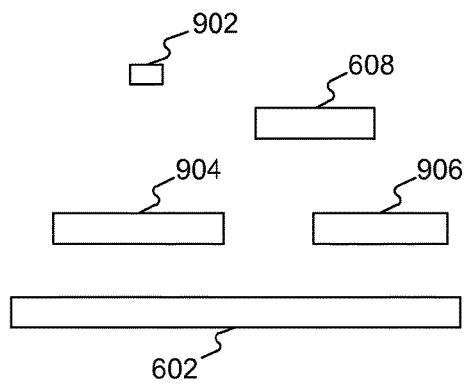
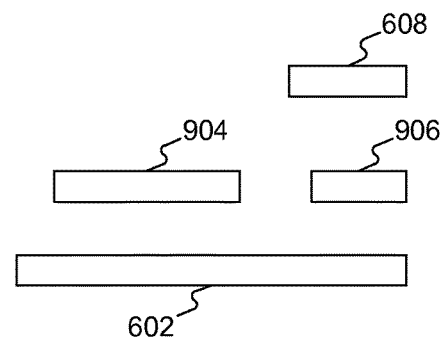
FIG. 9C                FIG. 9D

COMPUTERIZED SYSTEMS AND METHODS FOR LAYERING CONTENT IN A USER INTERFACE

CROSS-REFERENCE TO RELATED APPLICATION(S)

This application claims the benefit of U.S. Provisional Patent Application No. 62/016,630, filed Jun. 24, 2014, the contents of which are hereby incorporated by reference in their entirety.

BACKGROUND

The present disclosure generally relates to computerized systems and methods for displaying content to users. More particularly, and without limitation, the disclosed embodiments relate to systems and methods for displaying content in virtual environments, including virtual three-dimensional environments.

Today, graphical user interfaces reflect an important way for delivering content and information to users. In the modern digital age, users interact with these interfaces on a variety of devices, including computers, mobile phones, televisions, personal digital assistants, handheld systems, radios, music players, printers, tablets, kiosks, and other devices. Many conventional interfaces often display content to users in a two-dimensional manner.

SUMMARY

The disclosed embodiments include systems and methods for analyzing, rendering, handling, and determining properties of objects within virtual environments, including virtual three-dimensional interface environments. Aspects of the disclosed embodiments provide systems and methods for creating object layers within a virtual environment, determining virtual heights of objects based on an object's layer, and rendering cast shadows on occluded objects based on the apparent (e.g., virtual) height differential between the two objects. Aspects of the disclosed embodiments also provide methods and systems for handling object operations within the virtual environments to comport with user expectations.

The disclosed embodiments include, for example, a system for rendering a virtual environment, the system comprising a memory storing a set of instructions and one or more processors coupled to the memory, the one or more processors configured to execute the set of instructions to perform one or more operations. The operations may include generating a plurality of object layers in the virtual environment, the object layers representing permissible height values within the virtual environment. The operations may also include populating the environment a plurality of objects, wherein each object is associated with a height value corresponding to one of the object layers. The operations may also include determining whether any two objects form an occluded pair, wherein an occluded pair comprises an occluding object and an occluded object, and wherein the occluding object is associated with an occluding object layer having a greater height value than an occluded object layer associated with the occluded object. The operations may also include determining a cast shadow index for each occluded pair, the cast shadow index reflecting a magnitude of a height differential between occluding object layer and the occluded object layer. The operations may also include rendering the virtual environment in accordance with the calculated cast shadow indices.

The disclosed embodiments may also include, for example, a method for rendering a virtual environment, the method comprising operations performed with one or more processors. The operations of the method may include generating a plurality of object layers in the virtual environment, the object layers representing permissible height values within the virtual environment. The method may also include populating the environment a plurality of objects, wherein each object is associated with a height value corresponding to one of the object layers. The method may also include determining whether any two objects form an occluded pair, wherein an occluded pair comprises an occluding object and an occluded object, and wherein the occluding object is associated with an occluding object layer having a greater height value than an occluded object layer associated with the occluded object. The method may also include determining a cast shadow index for each occluded pair, the cast shadow index reflecting a magnitude of a height differential between occluding object layer and the occluded object layer. The method may also include rendering the virtual environment in accordance with the calculated cast shadow indices.

The disclosed embodiments may also include, for example, a system for rendering a drag-and-drop process in a virtual three-dimensional environment displayed on a mobile device. The system may include a memory storing a set of instructions and one or more processors configured to execute the set of instructions to perform one or more operations. The operations may include generating a plurality of object layers, the object layers representing permissible height values within the virtual environment. The operations may also include detecting that a user has pressed a drag object associated with a drag object layer, the drag object layer corresponding to a height value less than a drop container layer associated with drop container object. The operations may also include rendering a new drop container with a height value less than the drag object layer. The operations may also include detecting a drag-and-drop action and rendering the virtual three-dimensional environment in accordance with the detected drag-and-drop action.

The disclosed embodiments may also include, for example, a method for rendering a drag-and-drop process in a virtual three-dimensional environment displayed on a mobile device. The method may include generating a plurality of object layers, the object layers representing permissible height values within the virtual environment. The method may also include detecting that a user has pressed a drag object associated with a drag object layer, the drag object layer corresponding to a height value less than a drop container layer associated with drop container object. The method may also include rendering a new drop container with a height value less than the drag object layer. The method may also include detecting a drag-and-drop action and rendering the virtual three-dimensional environment in accordance with the detected drag-and-drop action.

Additional features and advantages of the disclosed embodiments will be set forth in part in the description that follows, and in part will be obvious from the description, or may be learned by practice of the disclosed embodiments. The features and advantages of the disclosed embodiments will be realized and attained by means of the elements and combinations particularly pointed out in the appended claims.

It is to be understood that both the foregoing general description and the following detailed description are examples and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

BRIEF DESCRIPTION OF THE DRAWINGS

FIGS. 7A-7D depict an example occluded object handling environment and rendering effects, consistent with the disclosed embodiments.

FIGS. 9A-9D depict an example drag-and-drop process in an occluded environment, consistent with the disclosed embodiments.

DETAILED DESCRIPTION OF THE EXAMPLE EMBODIMENTS

Reference will now be made in detail to embodiments of the present disclosure, examples of which are illustrated in the accompanying drawings. Where possible, the same reference numbers will be used throughout the drawings to refer to the same or like parts.

The disclosed embodiments relate to systems and methods for analyzing, determining, rendering, and handling properties of objects within virtual environments, including virtual three-dimensional interface environments. In some aspects, the disclosed embodiments may determine these properties based virtual heights, priority parameters, created object layers, and/or other such information, consistent with the disclosed embodiments. In certain aspects, the disclosed embodiments may implement these processes to provide virtual three-dimensional environments for enhanced user experiences over conventional two-dimensional environments and interfaces. In some aspects, the disclosed embodiments render virtual environments through casting calculated shadows onto occluded objects to give the appearance of depth. The disclosed embodiments also may cast shadows in accordance with object heights, which may be based on generated object layers, thereby mimicking the user's expectations with real-world objects and lighting properties.

Determining object heights and rendering cast shadows in a virtual interface environment, including virtual three-dimensional interface environments, may provide one or more advantages. For example, in virtual environments where casting shadows may be the primary cue for indicating object depth, it may prove advantageous to provide processes for rendering, processing, and handling the cast shadows in a consistent, normalized, and/or aesthetically pleasing manner. Furthermore, it may prove advantageous to create virtual environments in which cast shadows mirror a user's experience with physical shadows and lighting properties to enhance a user's experience and provide a greater sense of immersion.

Figure 1:
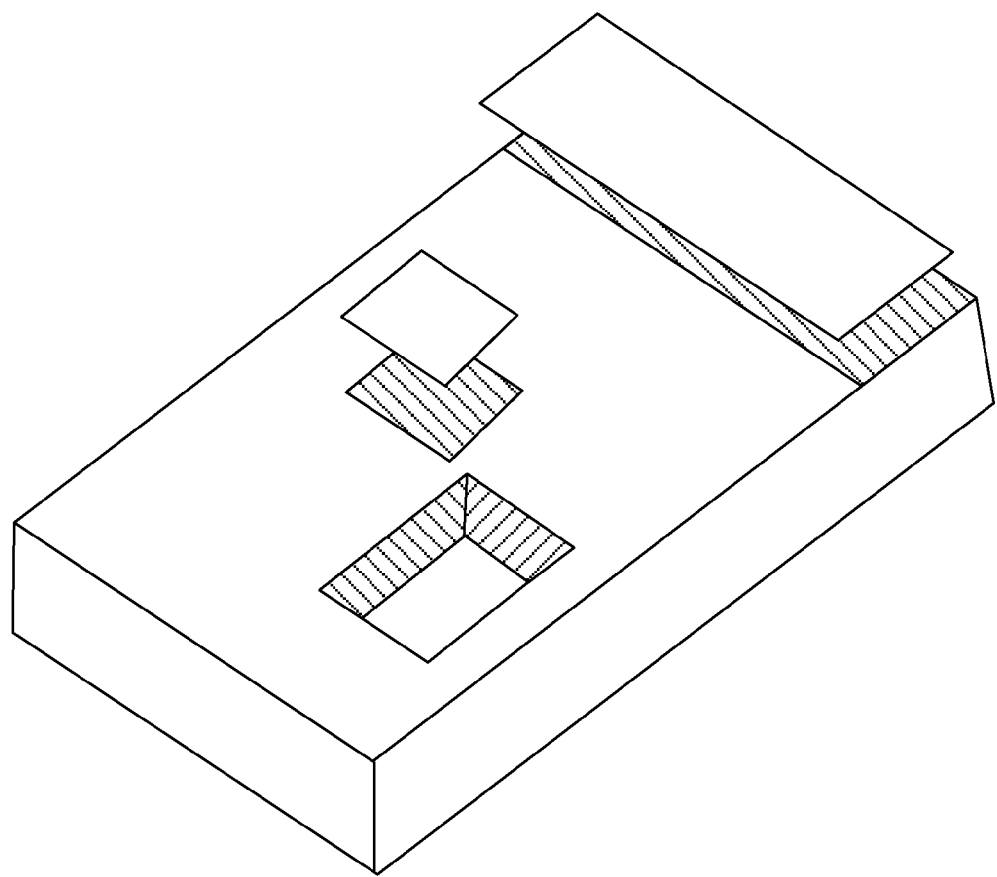
FIG. 1 depicts an example three-dimensional graphical user interface displayed on a client device, consistent with the disclosed embodiments.

FIG. 1 depicts an example three-dimensional graphical user interface displayed on a client device, consistent with the disclosed embodiments. In some aspects, a three-dimensional interface may differ from a conventional two-dimensional interface in that it permits objects to associate with height values. In certain embodiments, a three-dimensional virtual environment may be associated with an environment depth, reflecting the maximum apparent height differential any two rendered objects. In certain embodiments, a three-dimensional virtual environment may include a virtual camera for providing a perspective with which to view and render the three-dimensional environment. In some aspects, devices displaying such three-dimensional scenes may be configured to indicate the depths of objects via one or more processes consistent with the disclosed embodiments, such as cast shadows, occlusion, and the like.

Figure 2:
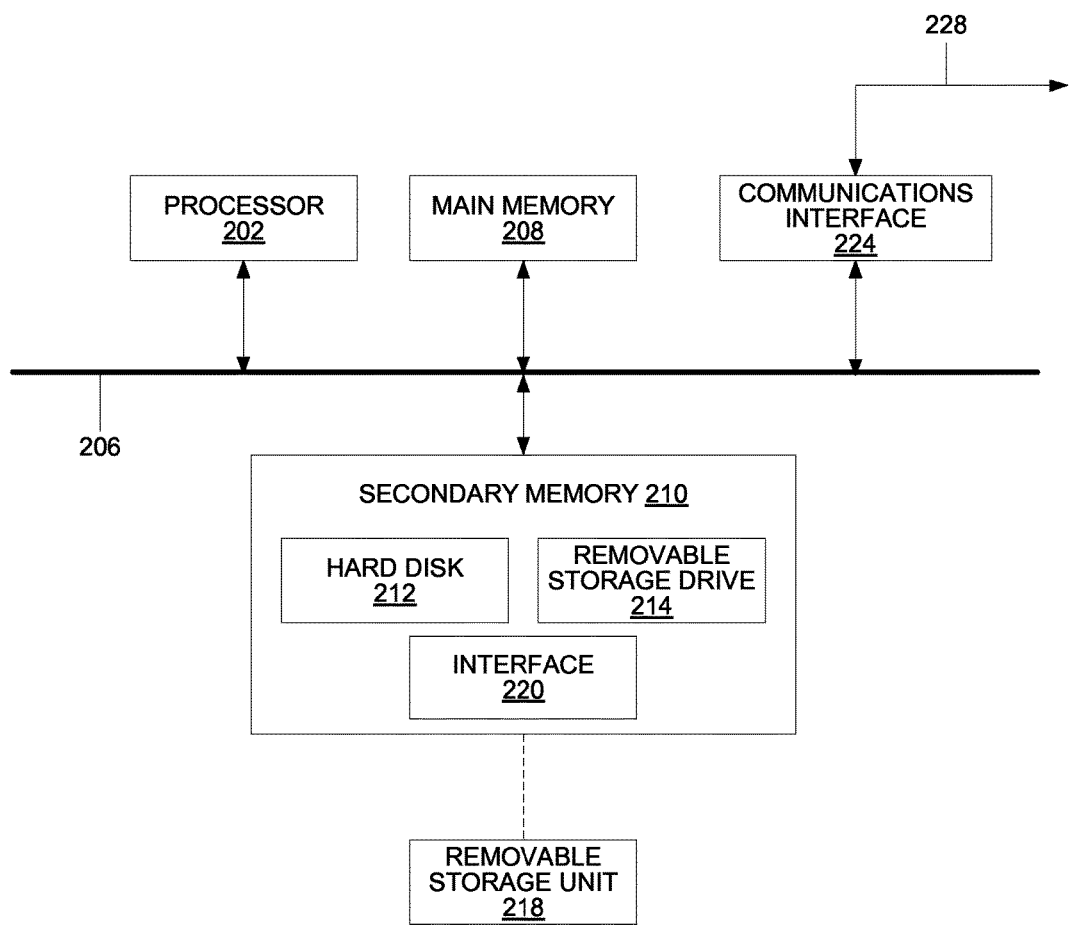
FIG. 2 depicts an example computing system for implementing processes, consistent with the disclosed embodiments.

FIG. 2 depicts a block diagram of an example computer system 200 with which certain aspects consistent with the disclosed embodiments may be implemented. For example, in some aspects, computer system 200 may reflect computer systems associated with a device (e.g., a client device of FIG. 3) performing one or more of the processes disclosed herein. In some embodiments, computer system 200 may include one or more processors 202 connected to a communications backbone 206 such as a bus or external communications network (e.g., any medium of digital data communication such as a LAN, MAN, WAN, cellular network, WiFi network, NFC link, Bluetooth, GSM network, PCS network, I/O connection, any wired connection such as USB, and any associated protocols such as HTTP, TCP/IP, RFID, etc).

In certain aspects, computer system 200 may include main memory 208. Main memory 208 may comprise random access memory (RAM) representing a tangible and non-transitory computer-readable medium storing computer programs, sets of instructions, code, or data executed with processor 202. When executed by processor 202, such instructions, computer programs, etc, enable processor 202 to perform one or more processes or functions consistent with the disclosed embodiments. In some aspects, such instructions may include machine code (e.g., from a compiler) and/or files containing code that processor 202 may execute with an interpreter.

In some aspects, main memory 208 may also include or connect to a secondary memory 210. Secondary memory 210 may include a disk drive 212 (e.g., HDD, SSD), and/or a removable storage drive 214, such as a magnetic tape drive, flash memory, an optical disk drive, CD/DVD drive, or the like. The removable storage drive 214 may read from and/or write to a removable storage unit 218 in a manner known to the skilled artisan. Removable storage unit 218 may represent a magnetic tape, optical disk, or other storage medium that is read by and written to by removable storage drive 214. Removable storage unit 218 may represent a tangible and non-transitory computer-readable medium having stored therein computer programs, sets of instructions, code, or data to be executed by processor 202.

In other embodiments, secondary memory 210 may include other means for allowing computer programs or other program instructions to be loaded into d computer system 200. Such means may include, for example, another removable storage unit 218 or an interface 220. An example of such means may include a removable memory chip (e.g., EPROM, RAM, ROM, DRAM, EEPROM, flash memory devices, or other volatile or nonvolatile memory devices) and associated socket, or other removable storage units 218 and interfaces 220, which allow instructions and data to be transferred from the removable storage unit 218 to computer system 200.

Computer system 200 may also include one or more communications interfaces 224. Communications interface 224 may allow software and data to be transferred between computer system 200 and external systems (e.g., in addition to backbone 206). Communications interface 224 may include a modem, a network interface (e.g., an Ethernet card), a communications port, a PCMCIA slot and card, etc. Communications interface 224 may transfer software and data in the form of signals, which may be electronic, electromagnetic, optical or other signals capable of being received by communications interface 224. These signals may be provided to communications interface 224 via a communications path (i.e., channel 228). Channel 228 carries signals and may be implemented using wire, cable, fiber optics, RF link, and/or other communications channels. In one embodiment, the signals comprise data packets sent to processor 202. Information representing processed packets may also be sent in the form of signals from processor 202 through communications path 228.

In certain aspects, the computer-implemented methods described herein can be implemented on a single processor of a computer system, such as processor 202 of computer system 200. In other embodiments, these computer-implemented methods may be implemented using one or more processors within a single computer system and/or on one or more processors within separate computer systems in communication over a network.

In certain embodiments in connection with FIG. 2, the terms "storage device" and "storage medium" may refer to particular devices including, but not limited to, main memory 208, secondary memory 210, a hard disk installed in hard disk drive 212, and removable storage unit 218. Further, the term "computer-readable medium" may refer to devices including, but not limited to, a hard disk installed in hard disk drive 212, any combination of main memory 208 and secondary memory 210, and removable storage unit 218, which may respectively provide computer programs and/or sets of instructions to processor 202 of computer system 200. Such computer programs and sets of instructions can be stored within one or more computer-readable media. In certain aspects, computer programs and sets of instructions may also be received via communications interface 224 and stored on the one or more computer-readable media.

Figure 3:
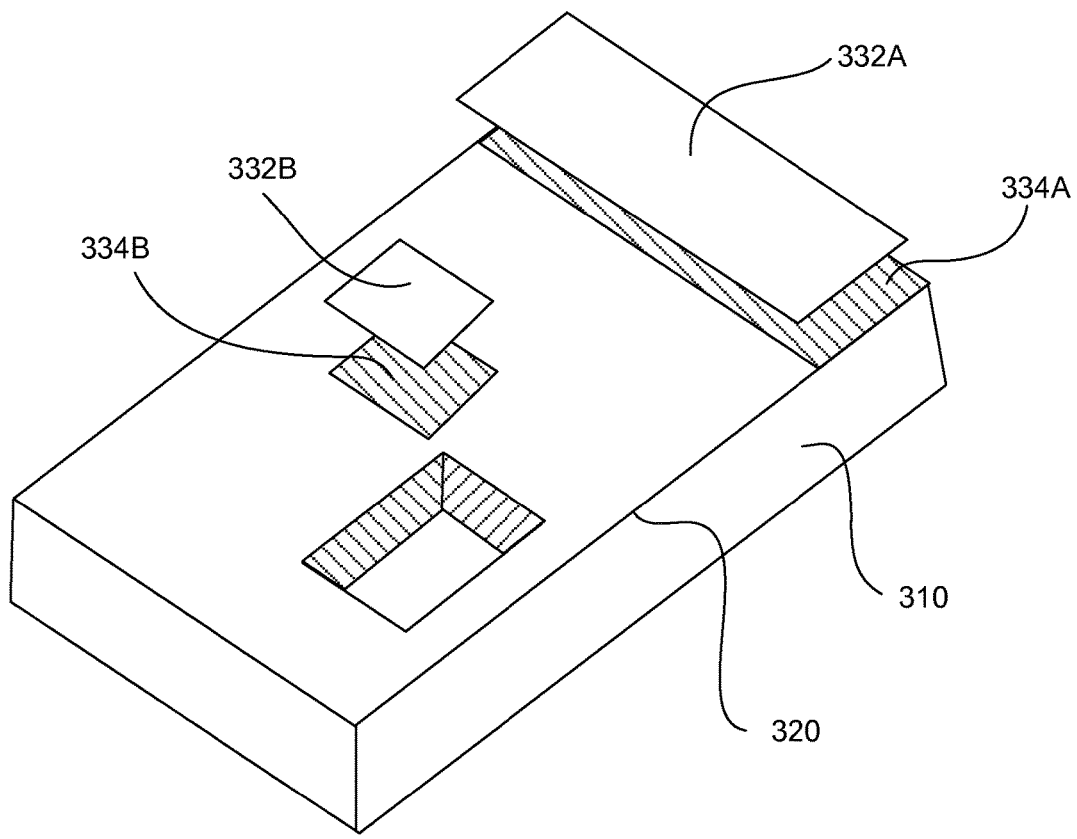
FIG. 3 depicts an example virtual three-dimensional graphical user interface displayed on a client device, consistent with the disclosed embodiments.

FIG. 3 depicts an example virtual three-dimensional graphical user interface displayed on a device, consistent with the disclosed embodiments. In certain aspects, the device (e.g., client device 310) may include, associate with, and/or interface with one or more displays (e.g., display 320) for displaying one or more interface objects (e.g., interface objects 332A and 332B) to the user.

In some aspects, client device 310 may include any computing device, data processing device, or display device consistent with the disclosed embodiments. For example, device 310 may include a personal computer, a laptop computer, a tablet computer, a notebook computer, a handheld computer, a personal digital assistant, a portable navigation device, a mobile phone, a wearable device, an embedded device, a smartphone, a television, a stereoscopic display, a handheld system, a digital radio, a music player, a printer, a kiosks, and any additional or alternate computing device capable of processing information and providing information to a display. In certain aspects, client device 310 may be implemented with one or more processors, computer-based systems (e.g., the example computing system of FIG. 2), or display systems (e.g., displays described in connection with display 320). In some aspects, client device 310 may include one or more client devices.

In certain embodiments, client device 310 may include, associate with, or interface with one or more displays 320. In some aspects, display 320 may comprise a display device or panel for portraying information. For example, display 320 may include one or more cathode ray tube (CRT) displays, liquid crystal displays (LCDs), plasma displays, light emitting diode (LED) displays, touch screen type displays, projector displays (e.g., images projected on a screen or surface, holographic images, etc), organic light emitting diode (OLED) displays, field emission displays (FEDs), active matrix displays, a vacuum fluorescent (VFR) displays, 3-dimensional (3-D) displays, electronic paper (e-ink) displays, microdisplays, or any combination of these displays. In some embodiments, display 320 may be included in client device 310. In other embodiments, display 320 may constitute a separate device communicating with client device 310 over a communications network (e.g., as discussed above with respect to FIG. 2).

In certain aspects, device 310 may be configured to display and render a graphical user interface for providing data, information, pictures, videos, applications, windows, views, objects, etc, to a user. In some embodiments, the interface may include one or more interface objects (e.g., objects 332A and/or 332B). In certain embodiments, an interface object may represent one or more items, units, or packages of information displayed on the interface. For example, an interface object (e.g., object 332A) may include an application window (e.g., windows associated with iOS, Microsoft Windows, Google Android, Apple OS X, another proprietary window, etc), a view, a button, a text box, an icon, a picture, a video, a field, a search field, a notification bar, an object container, or any other visual cue capable of providing information and/or receiving input. In certain aspects, interface object may comprise, include, or subsume other interface objects. For example, an interface object associated with an application window may comprise other interface objects associated with the application (e.g., buttons, fields, text, etc).

As shown in FIG. 3, device 310 may be configured to display one or more depth indicators (e.g., indicators 334A and 334B) on display 320. In some embodiments, a depth indicator may reflect a pictorial or graphical indication of an apparent depth or height of a corresponding interface object. In certain embodiments, for example, a depth indicator may take the form of a cast or inward shadow signifying that the corresponding interface object sits above another or below in a virtual three-dimensional environment (e.g., as shown in connection with indicators 334A and 334B). The nature, size, shape, color, extent intensity, consistency, uniformity, opacity, gradient, saturation, brightness, etc, of displayed depth indicators (e.g., a cast shadow) may be determined through processes consistent with the disclosed embodiments. In certain aspects, these parameters may vary depending on the relative virtual heights of its corresponding interface object and other objects (e.g., other interface objects and other depth indicators) rendered on the interface.

Device 310 may be configured to permit rendered objects (e.g., interface objects) to be located at any virtual height within a virtual environment. In certain embodiments, a virtual height may reflect the apparent distance a rendered object sits above a ground place (e.g., representing the lowest possible height value such as 0, −1, etc). In some embodiments, a virtual environment may be associated with an environment depth reflecting the maximum apparent height differential any two rendered objects. In certain embodiments, this environmental depth may reside some virtual distance away from a virtual camera viewing, displaying, and rendering the virtual environment.

In some embodiments, device 310 may be configured to permit objects (e.g., interface objects) to reside only within one or more object layers contained in the virtual environment (e.g., within the virtual boundaries of the environment). In certain aspects, an object layer may represent a permissible height value a rendered object may have. In certain embodiments, the object layers may comprise a continuous spectrum (e.g., all possible height values within the virtual environment are permitted). In other embodiments, the object layers may comprise discrete values (e.g., objects may reside only at certain heights within the virtual environment). In some embodiments, processes implemented in client device 310 may be configured to change the relative heights of objects (e.g., change the object layer in which the object is located) in response to, for example, user input, system processes, received data, or other triggers consistent with the disclosed embodiments.

Figure 4:
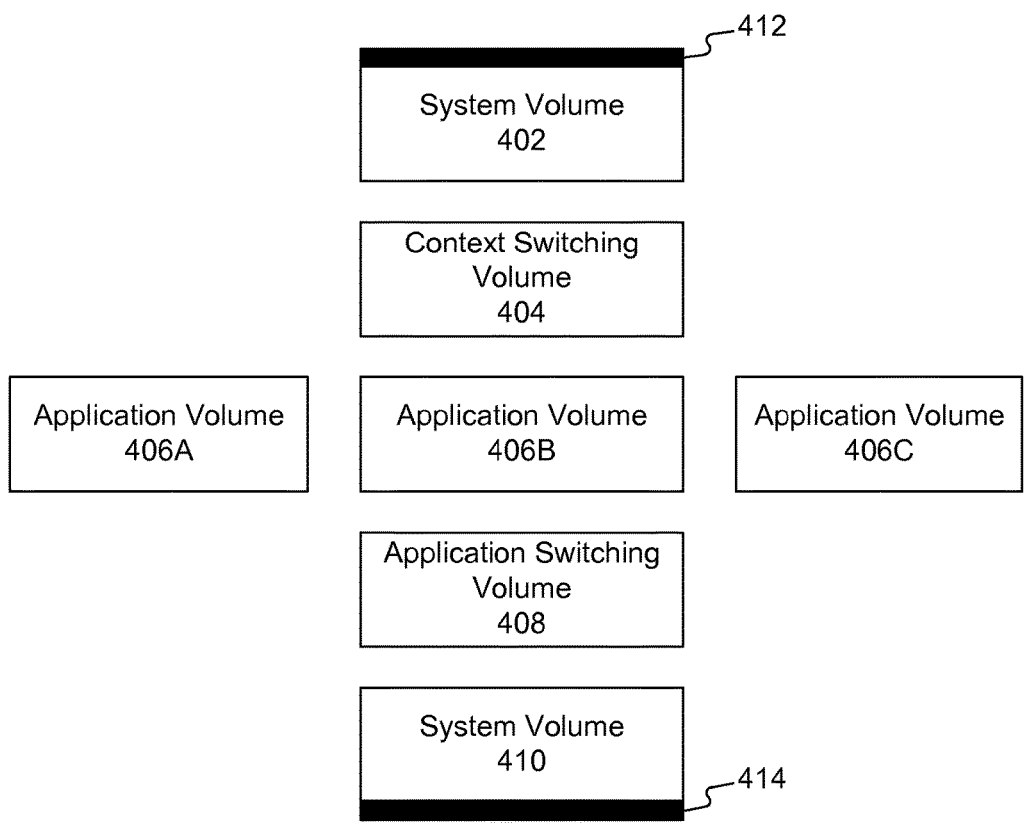
FIG. 4 depicts an example system priority hierarchy for rendering objects in an interface, consistent with the disclosed embodiments.

In certain aspects, object layers may form a hierarchy of permissible height values (e.g., object layers) representing how device 310 may render objects in a virtual scene. For example, FIG. 4 depicts an example system priority hierarchy 400 for rendering objects in an interface, consistent with the disclosed embodiments. In some aspects, hierarchy 400 may include one or more volumes (e.g., volumes 402, 404, etc) reflecting classes of height values (e.g., object layer heights) within a virtual environment. In some embodiments, objects associated with a volume of higher priority will appear to the user to sit in front of objects associated with a lower priority volume, as the higher priority objects will reside in object layers higher than those of lower priority. In certain aspects, a volume may be associated with one or more object layers. In addition, in some aspects, different volumes may be associated with a different number of object layers.

In certain embodiments, the volumes may be located within the bounds of an environment depth associated with the virtual environment. For example, in one embodiment, the volumes (and any object layers associated with the volumes) may reside within virtual boundaries defined by a ground plane 414 (e.g., representing the lowest height value an object may have), and a screen plane 412 (e.g., representing the highest height value an object may have). In some embodiments, the depth of the virtual environment may be determined from the difference in heights of screen plane 412 and ground plane 414. Consistent with the disclosed embodiments, device 310 may be configured to render objects only within the permitted object layers located between planes 412 and 414.

In some aspects, the volumes may represent general height values corresponding to classes of rendered objects. For example, in certain embodiments, device 310 may be configured to relate certain rendered objects for high-priority system processes (e.g., certain system overlays, alerts, notification bars, and/or any objects included therein) to system volume 402. In this example, objects located within system volume 402 will be located at heights above those objects in other volumes (e.g., these objects will reside in object layers above the other above other objects). In certain aspects, objects located within object layers associated with system volume 402 will appear to the user to sit "in front of" objects within other volumes, because those objects reside in object layers above those of lower height values. In this manner, each object and/or each object layer may be associated with a respective volume based on a class of the object and/or a class of the object layer.

In another example, hierarchy 400 may include a context switching volume 404 located below high-priority system volume 402. In certain aspects, the context switching volume may be associated with certain system and application functions processed on client device 310. For example, in one embodiment, the context switching volume 404 may be associated with functions related to intent disambiguation, focused views of content associated with an application or other volume (e.g., volumes 406A, 40B6B, 406C, etc), and the like functions.

Hierarchy 400 may also include one or more application volumes (e.g., volumes 406A, 406B, 406C, etc) associated with height values lower than the context switching volume 404. In certain embodiments, an application volume may include objects typically associated with application processes running on client device 310. For example, an application volume may include objects associated with applications such as text, buttons, fields, windows, views, etc, or any other object located within a running application.

Hierarchy 400 may include other volumes such an application switching volume 408 and low-priority system volume 410. In certain aspects, for example, an application switching volume may reflect object layers associated with recently open applications or processes consistent with switching between applications. In some aspects, low-priority system volume 410 may represent objects that may always be present, reside in the background, may be a part of the top system volume, and the like.

While FIG. 4 depicts certain volumes as having a certain size, name, and priority, it should be appreciated that hierarchy 400 may include an arbitrary number of volumes located within any permissible height of the virtual environment. Moreover, the use of certain terms in connection with volumes (e.g., "system volume") is intended for illustration and is not limiting.

Figure 5:
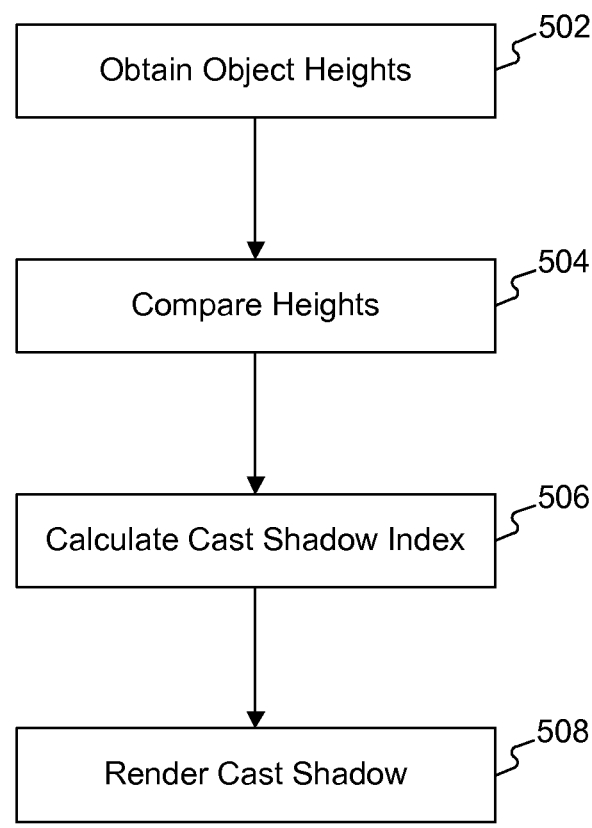
FIG. 5 depicts a flowchart of an example process for rendering a cast shadow based on object height differences, consistent with the disclosed embodiments.

The disclosed embodiments may be implemented to provide systems and methods for determining height values between objects and rendering an environment accordingly. FIG. 5 depicts a flowchart of an example process for rendering a cast shadow based on object height differences, consistent with embodiments of the present disclosure. In certain aspects, process 500 may be implemented in client device 310 implementing one or more computing systems or processors (e.g., the computing system 200 of FIG. 2).

As shown in FIG. 5, process 500 may include obtaining the heights of two objects rendered in an environment (step 502). In some aspects, process 500 may determine these heights based on the object layer(s) in which the objects reside. For example, if an object is located within an object layer associated with a particular height, process 500 may determine that the object is located at a height equal to the object layer in which it is located. In other embodiments, process 500 may determine an object's height based on other parameters associated with the object (e.g., a height value stored in a memory, main memory, etc, of device 310, such as a height association with a z-coordinate or position).

In certain embodiments, process 500 may compare the heights of two objects to determine a height difference associated with the two objects (step 504). In some embodiments, the difference in height may reflect an apparent distance one object is located above or below another object in a virtual environment. For example, if a first object is located in an object layer having a height value of 10 units and second object is located in an object layer having a height value of 4 units, process 500 may determine that the first object is located above the second by an amount of 6 units. In some embodiments, the units associated with such measurements may constitute density-independent pixels, although other sets of units (e.g., centimeters, arbitrary units, etc) are possible.

In some aspects, process 500 may include calculating a cast shadow index between two objects based on a height difference between the objects (step 506). In certain embodiments, the cast shadow index may represent characteristics of a shadow cast upon an object of a lower height value by an object of a higher height value. In certain aspects, the cast shadow index may reflect the magnitude of height differential between two objects. For example, the cast shadow index may indicate a strength, color, gradient, size, shape, brightness, etc, of a cast shadow to represent various differences in apparent height between two objects in an environment. For example, a first object residing just above a second object may cast a smaller, less distinct, fainter, lighter, etc, shadow than an third object located at a height higher than the first. In some aspects, objects residing in the same layer and/or adjacent layers may not cast shadows on one another (e.g., as described in connection with FIGS. 7A-7D). For example, device 310 may determine the drop shadow index to be zero for two objects whose height difference does not exceed a threshold value.

In certain aspects, process 500 may also be configured to set a cast shadow index to other values. For example, in one embodiment, device 310 may be configured to determine that certain types of objects (e.g., tool bars, system objects, etc), objects located within certain object layers, objects having a height difference below some predefined threshold, etc, do not cast shadows at all. For example, device 310 may determine that an occluding object is associated with a particular type or class of objects (e.g., a toolbar, system object, etc.), and may reduce all drop shadows generated by this class to zero (e.g., by modifying the cast shadow index to zero. In another example, device 310 may be configured to cap, limit, increase, alter, or otherwise modify a calculated cast shadow index to a minimum or maximum value (e.g., a shadow strength limit) for objects of a certain type, residing in a certain layer, or having a certain height difference. Device 310 may limit, for instance, cast shadow indices associated with this object to a particular shadow strength limit or range, etc.

In certain embodiments, process 500 may include rendering a cast shadow in the virtual environment based on the cast shadow index (step 508). In some aspects, rendering the cast shadow may include rendering the cast shadow on the object associated with a lower height value (e.g., the occluded object). In certain aspects, rendered cast shadows may combine with others. For example, if a first object sits above a second object, which in turn sits above a third object, process 500 may combine a cast shadow from the first object onto the third object with a cast shadow from the second object onto the third object.

Figure 6:
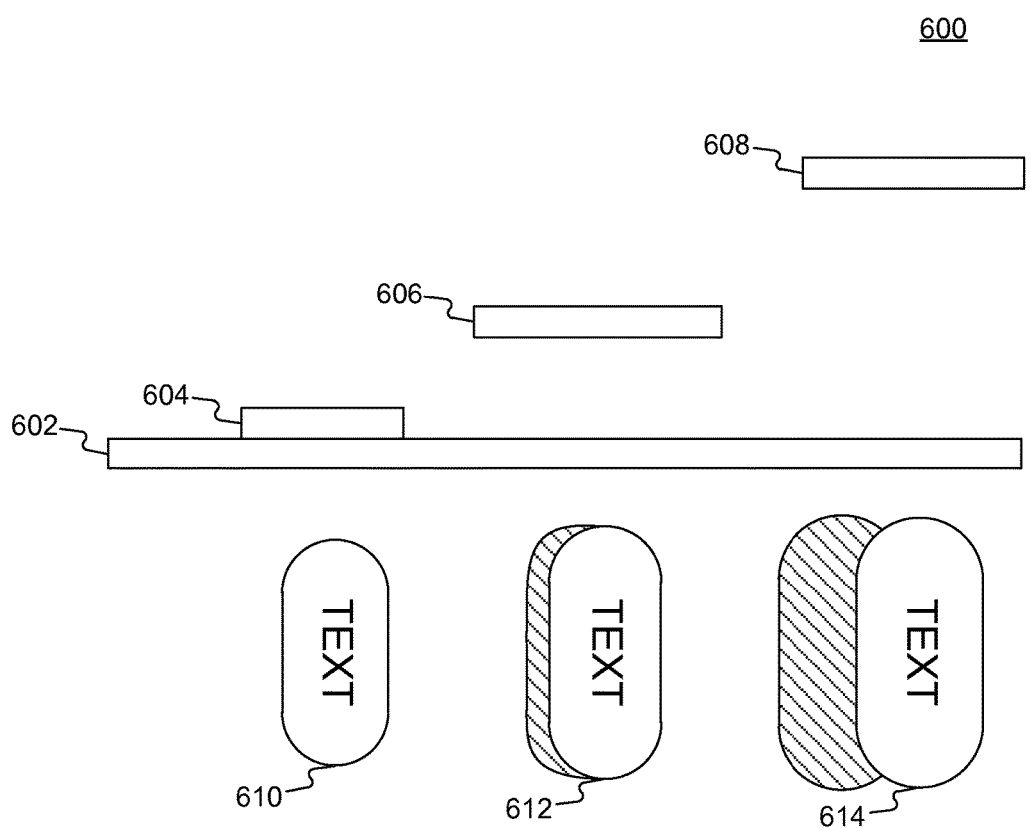
FIG. 6 depicts an example object layer environment and rendering effects, consistent with the disclosed embodiments.

FIG. 6 depicts an example object layer environment 600 and rendering effects, consistent with the disclosed embodiments. In some aspects, environment 600 may include a floor plane 602 representing the lowest permissible height an object within environment 600 may have (e.g., the lowest possible object layer within environment 600). In some aspects, floor plane 602 may represent a ground plane 414 associated with a particular environment, but such relationship is not required. For example, floor plane 602 may sit above ground plane 414, residing instead, for instance, on the lowest possible object layer associated with an application volume.

In certain embodiments, environment 600 may include an object in resting state 604 residing in an object layer located above floor plane 602. In certain aspects, the object layer associated with resting state 604 may be located directly above floor plane 602 (e.g., having a cast shadow index of zero), but such a relationship is not required. In certain aspects, device 310 may be configured determine a difference in height between an object in resting state 604 and floor plane 602, and render the scene accordingly (e.g., as described in connection with FIG. 5). For example, as depicted in FIG. 6, device 310 may perform processes to determine that the object in resting state 604 resides in an object layer just above floor plane 602, and calculate a cast shadow index reflecting that the object does not cast a shadow on floor plane 602 (e.g., as depicted with object 610).

In some embodiments, environment 600 may include objects located in one or more object layers located above the object layers associated with resting object 604 and/or floor plane 602. For example, environment 600 may include objects residing in a focused state 606 and/or a pressed state 608. In certain aspects, device 310 may be configured to render objects in a focused state to highlight, emphasize, or call out certain objects in environment 600. Device 910 may determine to place an object into the focused state based on instruction in an application or operating system running on the device. Similarly, in some embodiments, device 310 may be configured to send objects that the user has pressed (e.g., immediately, after a threshold amount of time, etc.) into an object layer associated with pressed state 608. Moreover, device 310 may place an object into the pressed state 608 when the user enters input consistent with a drag-and-drop action (e.g., to conduct processing consistent with FIGS. 9A-9E).

Device 310 may be configured to calculate the height differences between objects in these states and render the scene accordingly. For example, device 310 may be configured to determine that the relative height difference between an object in pressed state 608 and floor plane 602 is greater than the height difference between an object in the focused state 606 and the ground plane 602. In this example, device 310 may render the environment (e.g., consistent with cast shadow indices) to in such a way as to visually impart this information to the user. For instance, as shown in FIG. 6, the shadow associated with object 614 is larger than the shadow associated with object 612, indicating that object 614 is located in an object later above object 612. Device 310 may render the scene to reflect this information in any manner consistent with the disclosed embodiments (e.g., the strength, color, extent, saturation, etc, of a cast shadow).

As used herein, the terms "focused state," "pressed state" and "resting state" are intended to be illustrative and are not limiting. Moreover, while FIG. 6 depicts three possible states (e.g., object layers) an object may take, the disclosed embodiments provide for any number of such states, object layers, and permissible height values for rendered objects.

The disclosed embodiments may provide systems and methods for rendering objects and cast shadows in the presence of occlusion. For example, FIGS. 7A-7D depict an example occluded object handling environment and rendering effects, consistent with the disclosed embodiments. As shown in FIG. 7A, device 310 may render an environment in which an occluding object 702 partially occludes a second object (e.g., an object in resting state 604). In certain aspects, an occluding object may comprise any interface object consistent with the disclosed embodiments. Device 310 may determine that an occluding object occludes an occluded object based on, for instance, determining that the occluding object the lateral extents (e.g., x and y coordinates) of the objects overlap above some threshold amount, and determining that the height of the occluding object is greater than that of the occluded object. In some aspects, device 310 may be configured to render the environment consistent with the disclosed embodiments (e.g., as shown in FIG. 7B).

For example, device 310 may be configured to determine that the object in resting state 604 does not cast a shadow onto floor plane 602 (e.g., because the difference in heights falls below a threshold distance). Device 310 may also determine that occluding object 702 has a height value greater than (e.g., resides in a higher object layer) both the resting object and the floor plane 702. In this example, device 310 may also be configured to determine that occluding object 702 does not cast a shadow on the objects below it (e.g., floor plane 602 and the object in resting state 604) based on other factors consistent with the disclosed embodiments (e.g., object 702 is an instance of a class of objects that do not cast shadows).

Device 310 may be configured to change an object's position (e.g., change the object layer in which the object resides) in response to user input, system processes, or any other indicia consistent with the disclosed embodiments. As shown in FIG. 7C, for example, device 310 may be configured to move an object from a ground state 604 (or another state) to pressed state 608 in response to user input (e.g., a user touches, presses, or clicks the object, does so for a threshold amount of time, etc). In the example shown in FIG. 7C, the pressed state 608 is associated with a height value greater than resting state 604. In some aspects, device 310 may be configured to render the environment accordingly to reflect the updated position of the moved object. For example, as shown in FIG. 7D, device 310 may determine that the object moved to pressed state 608 now casts a shadow onto floor plane 602. In this example, the object layer associated with the pressed state is located at a height below the occluding object 702. In some aspects, device 310 may prevent an object in a pressed state 608 from residing in an object layer above occluding object 702 due to, for example, the object classes associated with the object in pressed state 608 and the occluding object 702, or any other process consistent with the disclosed embodiments.

Figure 8:
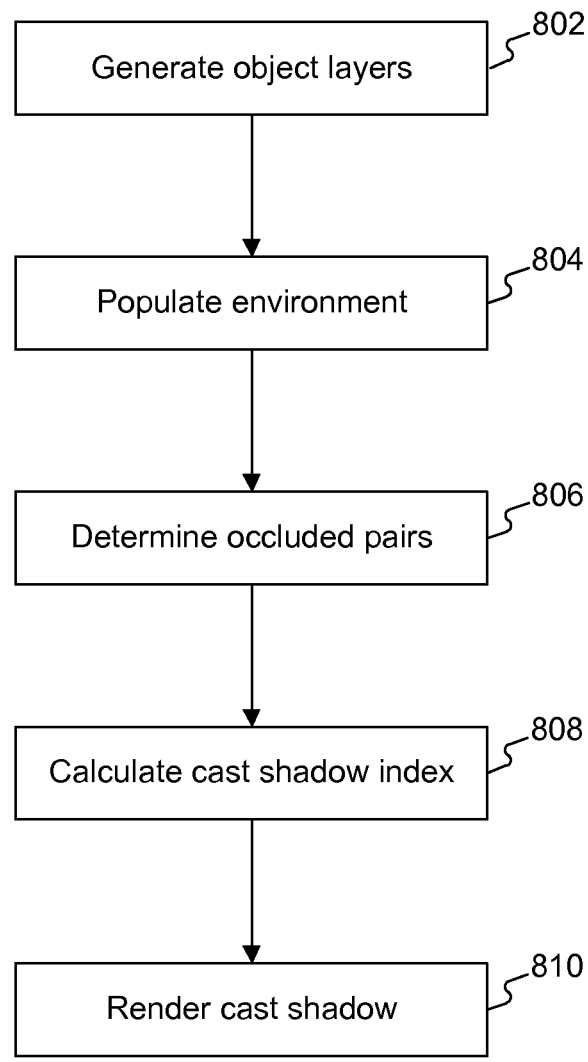
FIG. 8 depicts a flowchart of an example object layer creation and rendering process, consistent with the disclosed embodiments.

FIG. 8 depicts a flowchart of an example object layer creation and rendering process 800, consistent with the disclosed embodiments. In certain aspects, process 800 may be implemented in client device 310 implementing one or more computing systems or processors (e.g., the computing system 200 of FIG. 2).

In some embodiments, process 800 may include generating a plurality of object layers in which to populate objects in a virtual environment (step 802). In some aspects, the generated object layers may form discrete height levels within the virtual environment. In other aspects, the object layers may constitute continuous height values within the environment (e.g., objects may take an arbitrary height value between ground plane 414 and screen plane 412).

In certain aspects, process 800 may include populating a virtual environment with one or more objects (e.g., interface objects) (step 804). In some embodiments, populating the environment may comprise assigning each object to a particular object layer, assigning each object a particular height, assigning each object to a particular priority volume, or any other such process for specifying, indicating the absolute, relative, or approximate height of the object within the virtual environment.

In some aspects, process 800 may include determining whether any object populated or visible in a virtual environment occludes another object (step 806). In certain embodiments, process 800 may determine whether one object occludes another through, for example, comparing the coordinates of the two objects (e.g., and x, y, and/or z position in Cartesian coordinates), height values of the two objects layers associated with the two objects, determining camera properties associated with a virtual camera viewing the environment (e.g., the location of the camera, the perspective of the camera, the field of view of the camera, etc), and the like. For example, process 800 may determine that an occluding object occludes an occluded object by determining that the lateral extents (e.g., x and y coordinates) of the objects overlap above some threshold amount, comparing their heights (e.g., the heights of their respective object layers), and determining that one object resides in a layer higher or lower than the other. Because occlusion may require at least two objects in an environment, a set of objects in which one occludes the other may be referred to as an "occluded pair," though this description is not limiting.

In certain aspects, process 800 may include calculating a cast shadow index for every occluded pair consistent with the disclosed embodiments (e.g., consistent with the processes described in connection with FIG. 5) (step 808). In some embodiments, process 800 may then render the virtual three-dimensional environment in accordance with the one or more cast shadow indices (step 810). In some aspects, for instance, rendering the scene may include determining the sum or net effect of all dropped shadows based on the cast shadow indices of every occluded pair and rendering the scene accordingly. For example, process 800 may add, multiply, or otherwise combine the cast shadow indices for every object in the scene (e.g., by combining the indices of every occluded pair in which the object is a member) to render it properly. In some embodiments, process 800 may also limit the combined cast shadow indices to conform to a maximum or minimum value (e.g., the shadow strength limit or an aggregated shadow strength limit).

Figure 9E:
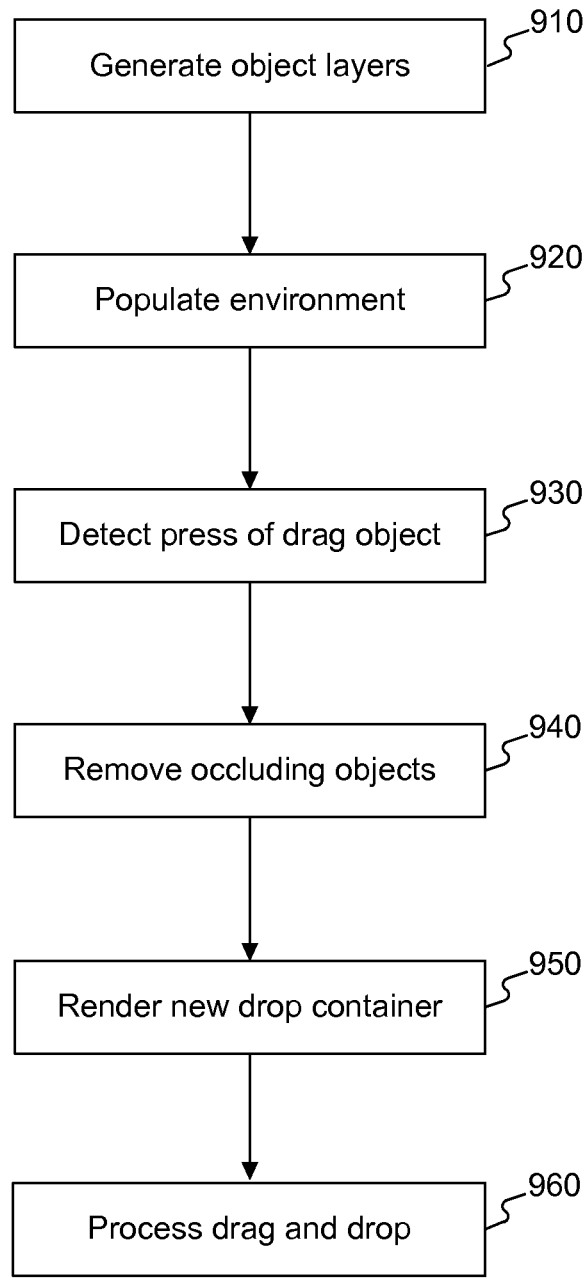
FIG. 9E depicts a flowchart of an example drag-and-drop process in an occluded environment, consistent with the disclosed embodiments.

The disclosed embodiments also provide methods and systems for handling user interactions, system processes, and object manipulation in the presence of occluded objects and rendering scenes accordingly. For example, FIGS. 9A-9D depict a block diagram of an example drag-and-drop process in an occluded environment, consistent with the disclosed embodiments. Similarly, FIG. 9E depicts a flowchart of an example drag-and-drop process consistent with the disclosed embodiments. In certain aspects, the processes described in reference to FIGS. 9A-9E may be implemented in client device 310 implementing one or more computing systems or processors (e.g., the computing system 200 of FIG. 2).

For example, FIG. 9A depicts an example environment in which it may be necessary to drag and drop an object in a pressed state 608 into a container associated with floating action object 902 (e.g., a drop container). As depicted in the example of FIG. 9A, the pressed button in state 608 may be occluded by occluding object 702, and the floating action object 902 may be located at a height greater than the object in pressed state 608. In this example, the floating action object 902 may represent a drop container associated with an object layer having a height value greater than and/or equal to that of the object in pressed state 608 and/or occluding object 702. In some aspects, the floating action object 902 may comprise any interface object for handling drag-and-drop functionality consistent with the disclosed embodiments.

In some aspects, device 310 may be configured to manipulate the objects in the environment to permit a user to drop the object in pressed state 608 into a container associated with floating action object 902. Device 310 may determine to conduct such manipulation based on any processes consistent with the disclosed embodiments. For example, device 310 may determine that an object has remained in a pressed state 608 for a threshold period of time and that another object in the scene having a higher height value (e.g., floating action object 902) is associated with a class of drop objects.

As shown in FIG. 9B, device 310 may be configured to remove, delete, slide away, dissolve, or move occluding object 702 away from the object in pressed state. In some aspects, device 310 may place (e.g., generate and display) a contextual action object 906 at a position below the object in pressed state 608 in place of the occluding object 702. In certain aspects, contextual action object 906 may represent an object visually identical or similar to occluding object 702, but residing at a height below the object in pressed state 608. In some embodiments, device 310 may create and render the contextual action object 906 such that it has similar or identical shadow characteristics to occluding object 702. For example, the device 310 may maintain, associate, and/or assign the value any of the drop shadow indices associated with occluding object 702 in contextual action object 906, despite the contextual action object 906 existing in a different object layer. In this manner, the contextual action object 906 may inherit visual and rendering properties from its parent occluding object 702. In other aspects, this replacement or maintenance is not required so that, for example, the device renders the contextual action object 906 as if it were a new object residing in its present layer irrespective of occluding object 702.

In certain embodiments, device 310 may also create, generate, display, or place a contextual floating action object 904 at a height below floating action object 902 and object in pressed state 608 to facilitate receiving the drop action. In some aspects, the contextual floating action object 904 may inherit properties from the parent floating action object 902 such as an identical or similar appearance and/or one or more drop shadow indices associated with floating action object 902. Device 310 may render contextual floating action object 904 using any process consistent with the disclosed embodiments. For example, contextual floating action object 904 may appear, dissolve into existence, fly in from a side of the display, expand from a central point based on the location of floating action object 902 (e.g., as depicted in FIGS. 9B and 9C), etc. Contextual floating action object 904 may also have its own properties irrespective to those of floating action object 902. For example, Device 310 may render contextual floating action object 904 such that it has its own cast shadow indices based on its own object layer and not those of floating action object 902.

In certain aspects, and as shown in the example environment of FIG. 9C, device 310 may modify the appearance of occluded object 702. For example, device 310 may cause the occluding object 702 to temporarily or permanently disappear from the scene. In certain embodiments, this removal may allow the user to freely visualize and manipulate the object in pressed state 608. In some embodiments, device 310 may also modify, remove, dissipate, dissolve, slide away, move, and/or reduce the appearance of the floating action object 902, and similarly modify, increase, emphasize, and/or change the appearance of contextual floating action button 904 (e.g., to indicate it may receive the object in pressed state 608).

In some aspects, as shown in FIG. 9D, device 310 may modify (e.g., reduce, remove, change appearance of, etc) the floating action object 902, leaving the environment with the pressed button 608, a contextual floating action object 904 (e.g., containing the same data as removed floating action object 902), and/or a contextual action object 906 (e.g., containing the same data as removed occluding object 702). In this manner, device 310 may be configured to allow a user, the system, and other processes to manipulate, interact with, and interface with objects freely, regardless of occlusion, cast shadows, height values, or other rendered environment effects.

FIG. 9E depicts a flowchart of certain aspects of the foregoing embodiments in an example drag and drop process 900. In certain aspects, process 900 may be implemented in client device 310 implementing one or more computing systems or processors (e.g., the computing system 200 of FIG. 2).

Process 900 may include generating a plurality of object layers (step 910). By way of example, the object layers may represent discrete or continuous permissible height values within a virtual environment rendered on a device display. In some aspects, process 900 may also include populating the environment (step 920) with one or more objects consistent with the disclosed embodiments (e.g., as described in connection with FIG. 8 and other embodiments disclosed herein).

In certain embodiments, process 900 may include detecting that a user has pressed a drag object (step 930). In some aspects, process 900 may determine that the user has entered input indicating a selection or press of the drag object for a certain threshold amount of time (e.g., one second). Additionally, or alternatively, process 900 may determine that the drag object has been placed in a pressed state 608 for a threshold amount of time, or any other detection consistent with the disclosed embodiments. In one aspect, for instance, process 900 may determine whether any drop container is presently displayed on the device and if so, determine the height of the drop container to determine if further processing is required. Further processing may be required, for instance, when the height of one of the drop containers is higher than that of the drag object (e.g., based on the heights of their respective object layers), one of the drop containers is completely occluded, etc.

Process 900 may include determining whether the object in the pressed state is occluded by another object (e.g., as described in connection with the processes of FIG. 8 or other process herein). When process 900 determines that the object in pressed state 608 is occluded by one or more other objects (e.g., an occluding object 702), process 900 may remove the occluding object(s) 702 from the display (step 940). This removal process may take any form consistent with the disclosed embodiments, such as sliding the occluding object(s) 702 away from the display, dissolving them, altering their color or transparency, making them disappear, etc. (e.g., as described in connection with FIGS. 9A-9D).

In some aspects, when process 900 determines that one or more drop containers is associated with an object layer having a height greater than that of the pressed (drag) object 608, process 900 may render one or more new drop containers (e.g., contextual floating action object 904) in the environment (step 950). The new drop containers may reside in (e.g., be assigned) an object layer having a height less than that of the pressed drag object 608 (e.g., as shown in FIGS. 9A-9C). In certain embodiments, the new drop containers may be visually similar or identical to those one more drop containers (e.g., floating action object 902) residing above the pressed drag object 608. In some embodiments, for example, a new drop container (e.g., contextual floating action object 904) may be assigned or inherit one or more drop shadow indices of a higher drop container (e.g., floating action object 902), despite residing in a lower object layer. In some aspects, process 900 may also include modifying the appearance of the one or more drop containers 902 residing above the pressed drag object (e.g., in pressed state 608), including removing them from the displaying, altering their color or transparency, or any other modification consistent with the disclosed embodiments.

Process 900 may process the drag and drop action consistent with the disclosed embodiments (step 960). In some aspects, processing the drag and drop action may comprise detecting a user's input reflecting a drag action across the display and rendering the environment accordingly (e.g., moving objects and interfaces associated with the dragged object over the screen in response to the user's input, updating drop shadow indices as the dragged object occludes and is occluded by other objects, etc.). For example, process 900 may detect that a user has dragged the object in pressed state 608 over a drop container (e.g., contextual floating action object 904), detect an input signaling the drop of the dragged object (e.g., the object is no longer in a pressed state), and conduct the necessary processing to handle dropping the object into the container as defined by applications and operating systems running on device 310.

In another example, process 900 may modify and/or update one or more cast shadow indices of the dragged object (e.g., for every occluded pair in which the dragged object is a member) in response to detecting and rendering a drag and drop action. In one embodiment, for instance, process 900 may set one, several, or all cast shadow indices of a dragged object to zero, another predetermined value, or otherwise restrict the range of acceptable cast shadow indices (e.g., confine such indices to a predetermined range of values). In addition, process 900 may modify one or more cast shadow indices of the drop container (e.g., floating action object 902, contextual floating action object 904, etc), occluding object 702, and/or contextual action object 906 in a similar manner (e.g., setting the drop shadow indices for every occluded pair in which such object is a member to zero or restrict these values to predetermined limits or ranges). In some aspects, process 900 may remove the temporary new drop container(s) 904 and/or contextual action object(s) 906 from the display and revert the objects to their original state.

For example, process 900 may return floating action object 902 and occluding object 702 back into their original object layers, as shown in FIG. 9A.

Figure 10A:
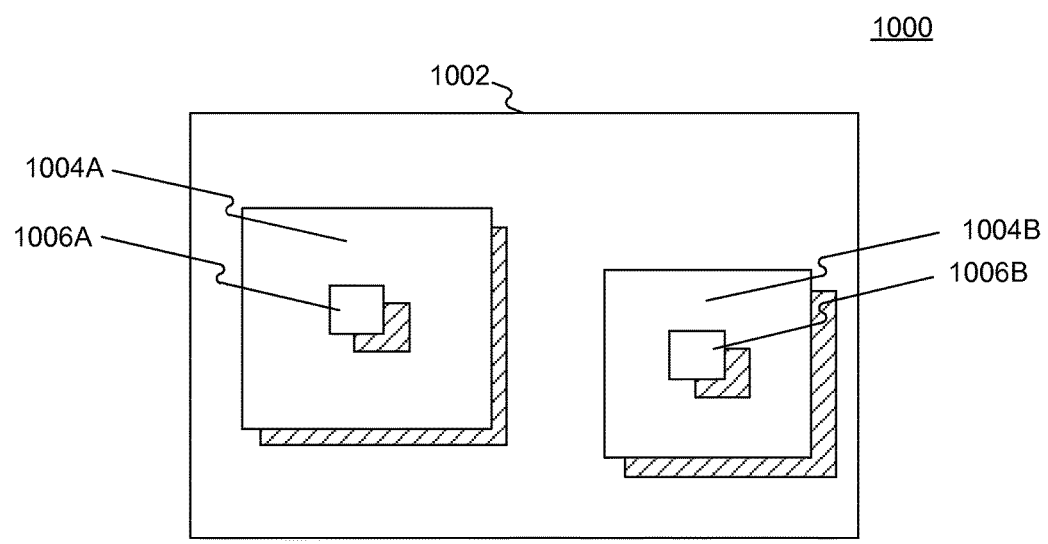
FIGS. 10A-10B depict an example window object rendering environment, consistent with the disclosed embodiments.
Figure 10B:
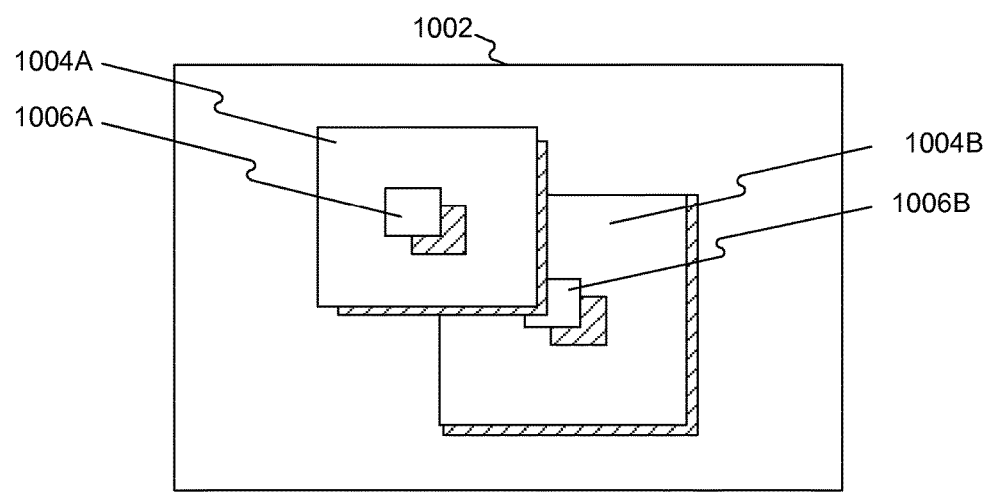

The disclosed embodiments also provide methods and systems for handling, processing, and rendering nested objects. For example, FIGS. 10A-10B depict an example window object rendering environment 1000, consistent with the disclosed embodiments. In certain aspects, the processes described in reference to FIGS. 10A-10D may be implemented in client device 310 implementing one or more computing systems or processors (e.g., the computing system 200 of FIG. 2).

In some embodiments, environment 1000 may include a window object 1002 containing view objects 1004A and 1004B. In some aspects, view objects 1004A and 1004B may themselves include or contain nested view objects 1006A and 1006B, respectively. In certain embodiments, the window object 1002, containing view objects 1004A and 1004B, and nested view objects 1006A and 1006B may comprise any interface object consistent with the disclosed embodiments (e.g., application windows, views, buttons, etc). As shown in FIG. 10A, device 310 may be configured to determine the heights of the objects within the scene and render the environment accordingly (e.g., as indicated by the presence of cast shadows).

In certain aspects, device 310 may be configured to track the heights of the objects rendered in the scene to handle, process, and render nested view objects occluding one another. In some embodiments, device 310 may perform these steps by, for instance, maintaining the heights for all objects in the scene, assigning priorities to certain objects of a particular volume or class (e.g., application windows, application volumes, etc), creating inheritance traits for nested objects, and the like. For example, as shown in FIG. 10B, device 310 may be configured to determine that view object 1004A has a height value greater than view window 1004B, and render the objects accordingly (e.g., rendering view object 1004A and its nested view object 1006A above view objet 1004B and its nested view object 1006B).

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a device system or existing communications software.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods, which fall within the true spirit and scope of the disclosure. As used herein, the indefinite articles "a" and "an" mean "one or more" in open-minded claims containing the transitional phrase "comprising," "including," and/or "having." Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments will be apparent to those skilled in the art from consideration of the specification and practice of the embodiments disclosed herein. It is intended that the specification and examples be considered as example only, with a true scope and spirit of the disclosed embodiments being indicated by the following claims.

What is claimed:

1. A system for rendering a virtual environment, the system comprising:
   one or more processors; and
   a memory storing instructions that when executed by the one or more processors cause the system to perform operations comprising:
      generating a plurality of object layers, the object layers representing permissible height values within a virtual environment;
      populating the virtual environment with a plurality of user selectable objects, wherein each of the user selectable objects is associated with a height value corresponding to one of the object layers;
      determining whether two user selectable objects form an occluded pair, wherein an occluded pair comprises an occluding object and an occluded object, and wherein the occluding object is associated with an occluding object layer having a greater height value than an occluded object layer associated with the occluded object;
      calculating a cast shadow index for each occluded pair, the cast shadow index reflecting a magnitude of a height differential between the occluding object layer and the occluded object layer; and
      rendering the virtual environment for display in accordance with the calculated cast shadow indices, wherein rendering the virtual environment comprises:
         casting, for each occluded pair, a shadow based on the cast shadow index onto the occluded object to give an appearance of depth;
         determining a net effect of cast shadows for the virtual environment by combining the calculated cast shadow indices; and
         limiting the combined cast shadow indices to an aggregated shadow strength limit.

2. The system of claim 1, wherein calculating the cast shadow index comprises:
   obtaining a height value associated with each object in the virtual environment;
   comparing the obtained height values for each occluded pair to obtain the magnitude of the height differential between the occluding object layer and the occluded object layer; and
   calculating the cast shadow index based on the magnitude of the height differential.

3. The system of claim 2, wherein the object layers form a discrete set of values within the virtual environment.

4. The system of claim 2, wherein the cast shadow index indicates at least one of a size, color, shape, or strength of a cast shadow rendered in the virtual environment.

5. The system of claim 2, wherein calculating the cast shadow index comprises:
   determining an occluding object class associated with the occluding object; and
   modifying the cast shadow index based on the occluding object class.

6. The system of claim 5, wherein modifying the cast shadow index comprises altering the cast shadow index to represent that the occluding object does not cast a shadow onto the occluded object.

7. A computer-implemented method for rending a virtual environment, the method comprising the following operations performed, by one or more processors:
   generating a plurality of object layers, the object layers representing permissible height values within a virtual environment;
   populating the virtual environment with a plurality of user selectable objects, wherein each of the user selectable objects is associated with a height value corresponding to one of the object layers;
   determining whether two user selectable objects form an occluded pair, wherein an occluded pair comprises an occluding object and an occluded object, and wherein the occluding object is associated with an occluding object layer having a greater height value than an occluded object layer associated with the occluded object;
   calculating a cast shadow index for each occluded pair, the cast shadow index reflecting a magnitude of a height differential between the occluding object layer and the occluded object, layer; and
   rendering the virtual environment for display in accordance with the calculated cast shadow indices, wherein rendering the virtual environment comprises:
      casting, for each occluded pair, a shadow based on the cast shadow index onto the occluded object to give an appearance of depth;
      determining a net effect of cast shadows for the virtual environment by combining the calculated cast shadow indices; and
      limiting the combined cast shadow indices to an aggregated shadow strength limit.

8. The computer-implemented method of claim 7, wherein calculating the cast shadow index comprises:
   obtaining a height value associated with each object in the virtual environment;
   comparing the obtained height values for each occluded pair to obtain the magnitude of the height differential between the occluding object layer and the occluded object layer; and
   calculating the cast shadow index based on the magnitude of the height differential.

9. The computer-implemented method of claim 8, wherein the object layers for a discrete set of values within the virtual environment.

10. The computer-implemented method of claim 8, wherein the cast shadow index indicates at least one of a size, color, shape, or strength of a cast shadow rendered in the virtual environment.

11. The computer-implemented method of claim 8, wherein calculating the cast shadow index comprises:
  determining an occluding object class associated with the occluding object; and
  modifying the cast shadow index based on the occluding object class.

12. The computer-implemented method of claim 11, wherein modifying the cast shadow index comprises altering the cast shadow index to represent that the occluding object does not cast a shadow onto the occluded object.

13. A system for rendering a drag-and-drop process in, a virtual environment, the system comprising:
  one or more processors; and
  a memory storing instructions that when executed by the one or more processors cause the system to perform operations comprising:
    generating a plurality of object layers, the object layers representing permissible height values relative to a ground plane within a virtual environment;
    detecting that a user has pressed a drag object associated with an occluded object layer, the occluded object layer corresponding to a height value less than an occluding object layer associated with a drop container object;
    calculating a cast shadow index reflecting a magnitude of a height differential between the occluded object layer and the occluding object layer;
    rendering a new drop container with a height value less than the occluded object layer; and
    rendering the virtual environment for display in accordance with a detected drag-and-drop action, wherein rendering the virtual environment comprises:
      casting a shadow based on the cast shadow index onto the drag object to give an appearance of depth;
      determining a net effect of cast shadows for the virtual environment by combining the cast shadow index with one or more other cast shadow indices calculated for one or more occluded pairs; and
      limiting the combined cast shadow indices to an aggregated shadow strength limit.

14. The system of claim 13, wherein the operations comprise:
  detecting that the drag object is occluded in the virtual environment by an occluding object associated with the occluding object layer;
  removing the occluding object from display; and
  modifying the appearance of the drop container object.

15. The system of claim 14, wherein modifying the appearance of the drop container object comprises removing the drop container object from display, and wherein the operations comprise:
  generating a contextual action object visually identical to the occluding object, the contextual action object residing in a contextual action object layer having a height value less than the occluded object layer; and
  rendering the contextual action object for display.

16. The system of claim 15, wherein generating the contextual action object comprises assigning the contextual action object one or more drop shadow indices associated with the occluding object; and wherein rendering the virtual environment comprises modifying the one or more drop shadow indices in response to detecting the drag-and-drop action.

17. A computer-implemented method for rendering a drag-and-drop process in a virtual environment, the method comprising the following operations performed by one or more processors:
  generating a plurality of object layers, the object layers representing permissible height values within a virtual environment;
  detecting that a user has pressed a drag object associated with an occluded object layer, the occluded object layer corresponding to a height value less than an occluding object layer associated with a drop container object;
  calculating a cast shadow index reflecting a magnitude of a height differential between the occluded object layer and the occluding object layer;
  rendering a new drop container with a height value less than the occluded object layer; and
  rendering the virtual environment in accordance with a detected drag-and-drop action, wherein rendering the virtual environment comprises:
    casting a shadow based on the cast shadow index onto the drag object to give an appearance of depth;
    determining a net effect of cast shadows for the virtual environment by combining the cast shadow index with one or more other cast shadow indices calculated for one or more occluded pairs; and
    limiting the combined cast shadow indices to an aggregated shadow strength limit.

18. The computer-implemented method of claim 17, wherein the operations comprise:
  detecting that the drag object is occluded in the virtual environment by an occluding object associated with the occluding object layer;
  removing the occluding object from display; and
  modifying the appearance of the drop container object.

19. The computer-implemented method of claim 18, wherein modifying the appearance of the drop container object comprises removing the drop container object from display, and wherein the operations comprise:
  generating a contextual action object visually identical to the occluding object, the contextual action object residing in a contextual action object layer having a height value less than the occluded object layer; and
  rendering the contextual action object for display.

20. The computer-implemented method of claim 19, wherein generating the contextual action object comprises assigning the contextual action object one or more drop shadow indices associated with the occluding object, and wherein rendering the virtual environment comprises modifying the one or more drop shadow indices in response to detecting the drag-and-drop action.

* * * * *